(12) United States Patent
Morrison et al.

(10) Patent No.: US 10,078,402 B2
(45) Date of Patent: Sep. 18, 2018

(54) TOUCH SENSITIVE DISPLAYS

(71) Applicant: Zytronic Displays Limited, Blaydon on Tyne (GB)

(72) Inventors: Andrew Morrison, Gateshead (GB); Philip Andrew Rudland, Sunderland (GB); Stephen Michael Ormston, Newcastle Upon Tyne (GB)

(73) Assignee: Zytronic Displays Limited, Blaydon on Tyne (GB)

( * ) Notice: Subject to any disclaimer, the term of this patent is extended or adjusted under 35 U.S.C. 154(b) by 11 days.

(21) Appl. No.: 14/400,616

(22) PCT Filed: May 30, 2013

(86) PCT No.: PCT/GB2013/051435
§ 371 (c)(1),
(2) Date: Nov. 12, 2014

(87) PCT Pub. No.: WO2013/179039
PCT Pub. Date: Dec. 5, 2013

(65) Prior Publication Data
US 2015/0130750 A1 May 14, 2015

(30) Foreign Application Priority Data

May 31, 2012 (GB) .................... 1209735.8

(51) Int. Cl.
*G06F 3/044* (2006.01)
*G06F 3/041* (2006.01)
(52) U.S. Cl.
CPC ............ *G06F 3/044* (2013.01); *G06F 3/0416* (2013.01); *G06F 2203/04104* (2013.01)
(58) Field of Classification Search
CPC ................................ G06F 3/044; G06F 3/0416
See application file for complete search history.

(56) References Cited

U.S. PATENT DOCUMENTS 3,417,492 A   12/1968 Rutland et al.
3,981,076 A    9/1976 Nicolas
(Continued)

FOREIGN PATENT DOCUMENTS

CN    101464759 A    6/2009
CN    102016775 A    4/2011
(Continued)

OTHER PUBLICATIONS

Griesbach, Axel, "International Search Report," prepared for PCT/GB2013/051435, dated Mar. 4, 2014, four pages.
(Continued)

*Primary Examiner* — Amr Awad
*Assistant Examiner* — Stephen Bray
(74) *Attorney, Agent, or Firm* — Winstead PC

(57) ABSTRACT

Disclosed are a touch sensitive display and a method of operation thereof. The display comprises a sensor having an input put array of electrodes and, capacitively coupled thereto, an output array of electrodes and a controller operable to perform a scan operation at every intersection point of said input array. The scan operation comprises measuring a touch value for an intersection point; determining a proportional difference between said touch value and a base touch value for said intersection point as a proportion of said base touch value, wherein said base touch value is indicative of there being no touch event on the sensor; and comparing the proportional difference to a predetermined proportional touch threshold so as to determine whether there is a touch event at that point.

19 Claims, 9 Drawing Sheets

(56) References Cited

U.S. PATENT DOCUMENTS

| | | |
|---|---|---|
| 4,693,778 A | 9/1987 | Swiggett et al. |
| 4,750,264 A | 6/1988 | Melero |
| 5,844,506 A | 12/1998 | Binstead |
| 6,011,244 A | 1/2000 | Castle et al. |
| 6,137,427 A | 10/2000 | Binstead |
| 6,239,389 B1 | 5/2001 | Allen et al. |
| 6,380,497 B1 | 4/2002 | Hashimoto et al. |
| RE40,867 E | 8/2009 | Binstead |
| 9,035,903 B2 | 5/2015 | Binstead |
| 9,223,436 B2* | 12/2015 | Land .................. G06F 3/0418 |
| 9,639,217 B2 | 5/2017 | Zhitomirskiy |
| 2004/0124765 A1 | 7/2004 | Iwase |
| 2008/0042997 A1 | 2/2008 | Endo |
| 2008/0158174 A1 | 7/2008 | Land et al. |
| 2008/0158176 A1 | 7/2008 | Land et al. |
| 2008/0251299 A1 | 10/2008 | Liao et al. |
| 2009/0160799 A1 | 6/2009 | Jiang et al. |
| 2010/0013800 A1 | 1/2010 | Elias et al. |
| 2010/0299914 A1 | 12/2010 | Lolli |
| 2011/0050618 A1* | 3/2011 | Murphy ............... G06F 1/3215 345/174 |
| 2011/0267309 A1 | 11/2011 | Hanauer et al. |
| 2011/0273394 A1 | 11/2011 | Young et al. |
| 2011/0279386 A1* | 11/2011 | Chang .................. G06F 3/0416 345/173 |
| 2011/0304570 A1 | 12/2011 | Maeda et al. |
| 2012/0013565 A1 | 1/2012 | Westhues et al. |
| 2012/0032916 A1 | 2/2012 | Enoki |
| 2012/0062250 A1 | 3/2012 | Kuo |
| 2012/0062498 A1* | 3/2012 | Weaver .............. G06F 3/03545 345/174 |
| 2012/0105370 A1* | 5/2012 | Moore .................. G06F 3/0412 345/174 |
| 2012/0111479 A1 | 5/2012 | Sung et al. |
| 2012/0168204 A1 | 7/2012 | Vance |
| 2012/0223911 A1* | 9/2012 | Westhues ............ G06F 3/0412 345/174 |
| 2012/0225151 A1 | 9/2012 | Ruhe et al. |
| 2012/0299868 A1* | 11/2012 | Bhagavat ............... G06F 3/044 345/174 |
| 2012/0327019 A1 | 12/2012 | Takao |
| 2013/0147752 A1* | 6/2013 | Simmons ............... G06F 3/044 345/174 |
| 2015/0035794 A1 | 2/2015 | Zhitomirskiy |
| 2015/0092119 A1 | 4/2015 | Yeh et al. |
| 2015/0109241 A1 | 4/2015 | Morrison |
| 2015/0145815 A1 | 5/2015 | Morrson |

FOREIGN PATENT DOCUMENTS

| | | |
|---|---|---|
| CN | 102160020 A | 8/2011 |
| CN | 202033733 U | 11/2011 |
| DE | 102006000852 A1 | 7/2007 |
| DE | 102006060385 A1 | 11/2007 |
| DE | 202012101394 U1 | 5/2012 |
| DE | 202012101429 U1 | 5/2012 |
| EP | 113820 A2 | 7/1984 |
| EP | 0297018 A2 | 12/1988 |
| EP | 1100296 A1 | 5/2001 |
| GB | 1352557 A | 5/1974 |
| GB | 2085233 A | 4/1982 |
| GB | 2450396 A | 12/2008 |
| JP | H01309400 A | 12/1989 |
| JP | H0457387 A | 2/1992 |
| JP | H04221900 A | 8/1992 |
| JP | H05241720 A | 9/1993 |
| JP | H06-295221 A | 10/1994 |
| JP | H08273457 A | 10/1996 |
| JP | 2000174419 A | 6/2000 |
| KR | 100713319 B1 | 5/2007 |
| KR | 20110039082 A | 4/2011 |
| KR | 20120013779 A | 2/2012 |
| WO | WO-9527334 A1 | 10/1995 |
| WO | WO-08017682 A2 | 2/2008 |
| WO | WO-08114091 A2 | 9/2008 |
| WO | WO-2009134727 A1 | 11/2009 |
| WO | WO-11023159 A1 | 3/2011 |
| WO | WO-11098892 A1 | 8/2011 |
| WO | WO-2012118540 A1 | 9/2012 |
| WO | WO-2013179039 A2 | 12/2013 |
| WO | WO-2013179040 A2 | 12/2013 |
| WO | WO-2013179050 A2 | 12/2013 |

OTHER PUBLICATIONS

Rekimoto, Jun; "SmartSkin: An Infrastructure for Freehand Manipulation on Interactive Surfaces"; CHI 2002; Apr. 2002; 8 pages.

* cited by examiner

Fig. 7

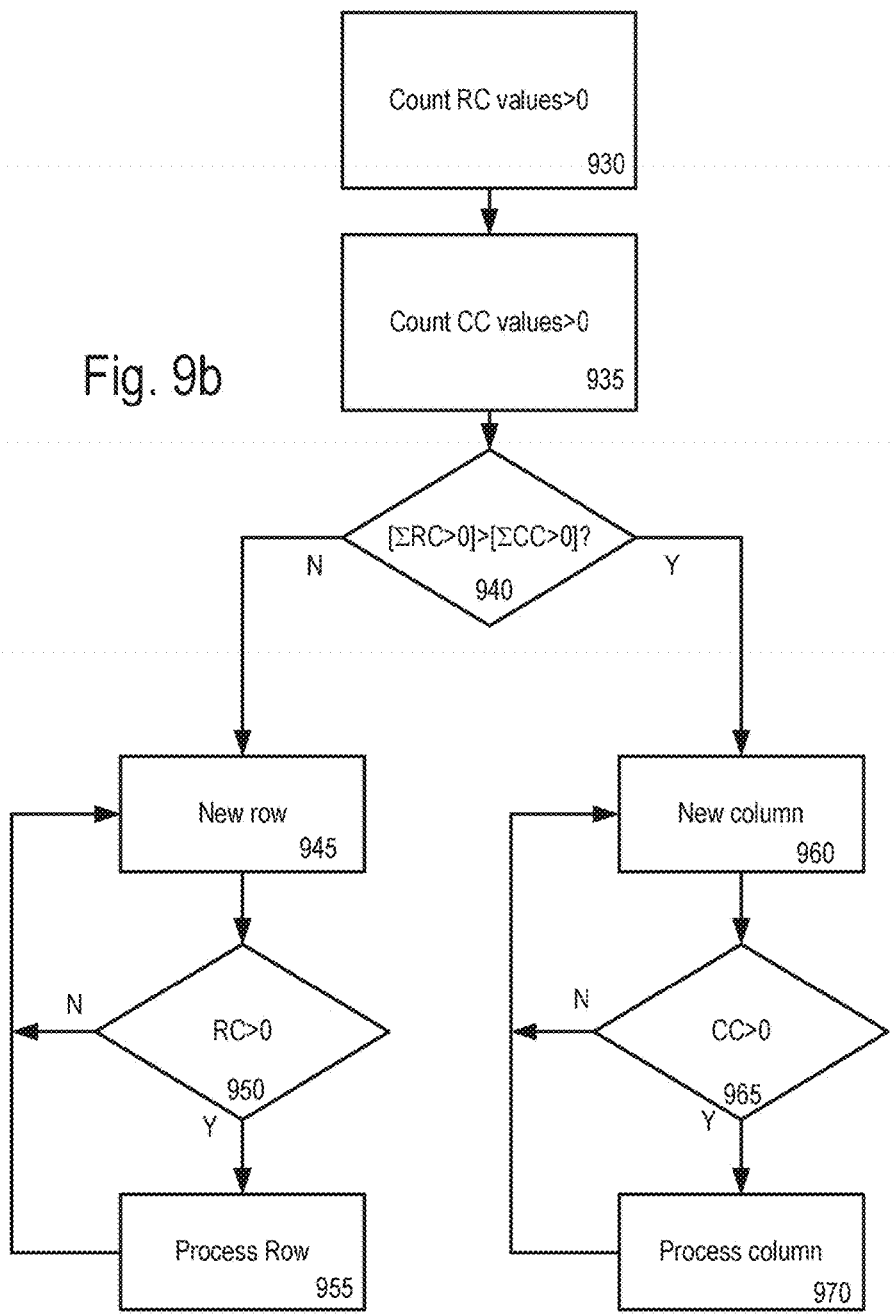

TOUCH SENSITIVE DISPLAYS

TECHNICAL FIELD

The present invention relates to arrangements for detecting user touch input for use in touch sensitive displays and in particular for detecting user multi-touch, i.e. more than one touch input from a user at the same time.

BACKGROUND

Personal computing devices equipped with touch sensitive displays are well known and widely used. Such displays allow a user to control a device by "touch inputs", i.e. by touching a touch sensitive panel typically positioned over a display screen.

Recent advances in so-called "multi-touch" technology have allowed the development of multi-touch devices, whereby a touch sensitive display of device can derive control information from multiple simultaneous touches by a user. Multi-touch technology increases the amount of control a user has over a device and increases the usefulness and desirability of the device.

Development of multi-touch technology has been mainly limited to comparatively small-scale personal computing devices such as smart-phones and tablet computers. However, there is recognition that providing multi-touch touch sensitive displays in other areas could lead to improved devices of other types.

Conventional multi-touch display devices use a so-called "mutual capacitance" technique whereby the level of charge transferred from a first set of conductors (i.e. electrodes) to a second set of conductors by virtue of capacitive coupling is monitored. A reduction in this charge transfer indicates a user touch. Other techniques can be used to detect user touch, such as so-called "self-capacitance" techniques whereby a change in capacitance of isolated conductors arranged in a grid pattern is monitored. However, self-capacitance based techniques perform poorly when trying to distinguish between multiple simultaneous touches and are therefore not appropriate for multi-touch applications.

A conventional mutual-capacitance based multi-touch display device comprises a touch-sensitive panel overlaid on a display screen. The touch sensitive panel includes a first (input) array layer comprising a first set of conducting electrodes and a second (output) array layer comprising a second set of conducting electrodes. The first and second array layers are separated by a number of insulating layers and positioned under a transparent protective substrate usually made from glass. The first and second set electrodes are made from indium tin oxide (ITO). ITO when deposited in thin enough layers becomes transparent and is generally considered to be the best material for use in the panels that are positioned over display screens.

The electrodes of the first array layer are arranged to cross the electrodes of the second array layer at a number of crossing points. Transfer of charge due to capacitive coupling between the electrodes of the first and second layers at the various crossing points is monitored. A user touch (e.g. a user bringing a finger or a capacitive stylus into close proximity or physical contact with the touch sensitive panel) is detected when a drop in the level of charge transferred by capacitive coupling is detected at a crossing point. This is due to charge that would otherwise have been transferred from one electrode layer to the other at the crossing point instead being transferred into the user (or stylus).

There are a number of drawbacks to conventional techniques for providing touch sensitive panels for multi-touch devices. In particular, the processing of information from the output electrode array may be very intensive, reducing responsiveness and deteriorating the user experience. An example of this is the perceived requirement to repeat every sensing scan at every crossing point in order to minimise the effect of noise.

It would be desirable to reduce the processing overhead for touch sensitive displays.

In a first aspect of the invention there is provided a touch sensitive display comprising a sensor having an input array of electrodes and, capacitively coupled thereto, an output array of electrodes; wherein said touch sensitive display comprises a controller operable to perform a scan operation at every intersection point of said input array, said scan operation comprising:

measuring a touch value for an intersection point;
determining the proportional difference between said touch value and a base touch value for said intersection point as a proportion of said base touch value, wherein said base touch value is indicative of there being no touch event on the sensor; and
comparing said proportional difference to a predetermined proportional touch threshold so as to determine whether there is a touch event at that point.

Said controller may be further operable to measure said base touch value for each intersection point.

Said proportional touch threshold may be defined as a the difference between a touch value and a base touch value, as a proportion of said base touch value, indicative of there being a touch event.

Said predetermined proportional touch threshold may be set at any value between 5% and 50%, or at a value between 10% and 30%.

Said sensor may be operable such that a change in voltage applied to one of the electrodes of said input array results in a voltage pulse on the output array electrodes, the magnitude of which is indicative of a touch event.

Each of the electrodes of said input array of electrodes and said output array of electrodes may comprise a conducting wire individually insulated with an insulating coating. The conducting wire may comprise a metallic electrode material such as copper, nickel, tungsten or similar. The conducting wire may be of diameter 8 μm to 18 μm. The insulating coating may comprise a polyurethane coating. The insulating coating may have a thickness of 1 μm to 2 μm.

In some embodiments, the electrodes of said input array of electrodes are arranged substantially orthogonal to the electrodes of said output array of electrodes, each intersection point being where an input electrode crosses an output electrode.

Said input array of electrodes and said output array of electrodes may be laid over each other so as to form a single electrode array layer in the panel. In accordance with these embodiments the electrodes can be laid down on a supporting substrate as a single layer and in a single manufacturing step.

Said controller may be arranged to detect a touch at an intersection point by transmitting a pulse on an input electrode and monitoring a corresponding pulse energy on one or more output electrodes, said corresponding pulse arising due to capacitive coupling between the input electrode and the one or more output electrodes. The touch may be detected at the intersection point upon the controller unit detecting a reduction in pulse energy on one of the output electrodes, compared to the other output electrodes and/or to the same output electrode at an earlier time, said one of the output electrodes corresponding to the intersection point.

In a further aspect of the invention there is provided a method of operating a touch sensitive display, said touch sensitive display comprising a sensor having an input array of electrodes and, capacitively coupled thereto, an output array of electrodes; said method comprising performing a scan operation at every intersection point of said input array, said scan operation comprising:

measuring a touch value for an intersection point;

determining the proportional difference between said touch value and a base touch value for said intersection point as a proportion of said base touch value, wherein said base touch value is indicative of there being no touch event on the sensor; and comparing said proportional difference to a predetermined proportional touch threshold so as to determine whether there is a touch event at that point.

Various further aspects and features of the invention are defined in the claims.

Also described is a touch sensitive display comprising a sensor having an input array of electrodes and, capacitively coupled thereto, an output array of electrodes; wherein said touch sensitive display comprises a controller operable to:

perform a scan operation at every intersection point of said input array and output array, so as to obtain a touch value for every point, said touch value being indicative as to whether there is a touch event at that point, said intersection points being arranged into subsets;

compare said touch value to a predetermined first threshold; and process only those subsets which comprise at least one intersection point that has a touch value exceeding the first threshold.

For the avoidance of doubt it should be appreciated that a touch value exceeding the threshold should not necessarily be taken to mean a touch value larger in magnitude. Where the touch value decreases from an untouched "base" value as a result of a touch, exceeding the first threshold will comprise the touch value falling below (in magnitude) the first threshold.

Said intersection points may be arranged in rows and columns, wherein said subsets are either said rows or said columns. In a specific embodiment, the controller is further operable to determine and compare the processing effort required in performing the processing step when said subsets are rows and in performing the processing step when said subsets are columns, and to select said subsets to be rows or columns according to which requires the least processing effort. Said determination may be based upon a determination of the number of rows having at least one intersection point that has a touch value exceeding the first threshold, a determination of the number of columns having at least one intersection point that has a touch value exceeding the first threshold, and the number of intersection points in each row and column.

Each of said subsets may have a counter attributed to it, said counter being incremented for each intersection point having a touch value exceeding the first threshold comprised within its corresponding subset. Alternatively, each of said subsets may have a binary flag attributed to it, said binary flag being set should its corresponding subset comprise an intersection point having a touch value exceeding the first threshold.

Said predetermined first threshold may be at a level lower than that of a touch threshold indicative of a touch event.

Also described is a touch sensitive display apparatus comprising:

a sensor comprising an input array of electrodes and, capacitively coupled thereto, an output array of electrodes;

a plurality of reception circuits, each reception circuit being operable to simultaneously receive a signal from a different electrode of said output array of electrodes;

wherein said reception circuits each comprise an analogue to digital converter.

Each reception circuit may comprise a peak level detector and an amplifier.

Different subsets of said array of output electrodes may each be connected to a different reception circuit, such that each reception circuit is arranged to receive inputs from a particular subset of said array of output electrodes. Said output array of electrodes may be evenly distributed into said subsets. Said output array of electrodes may comprise parallel rows, said apparatus being arranged such that said output array of electrodes are distributed into said subsets in an interleaved manner, such that adjacent electrodes are not in the same subset and not connected to the same reception circuit. In one embodiment, where there are n reception circuits, each nth electrode of said array of output electrodes, in sequence, may be connected to the same reception circuit. "Row" in this context is not to be taken to imply a direction, and may mean vertical columns or rows arranged horizontally across the sensor.

Also described is a touch sensitive display comprising a sensor having an input array of electrodes and, capacitively coupled thereto, an output array of electrodes; wherein said touch sensitive display comprises a controller operable to:

perform a scan operation at every intersection point of said input array and output array, so as to obtain a touch value for each intersection point, said touch value being indicative as to whether there is a touch event at the intersection point; and repeat said scan operation for only the intersection points for which the touch value meets a predetermined criteria, no further scan operations being performed for the intersection points for which the touch value does not meet said predetermined criteria.

Said controller may be operable to compare said touch value to a predetermined resample threshold, wherein said predetermined criteria comprises said touch value exceeding said predetermined resample threshold.

For the avoidance of doubt it should be appreciated that, a touch value exceeding the threshold here should not necessarily be taken to mean a touch value larger in magnitude. Where the touch value decreases from an untouched "base" value as a result of a touch, exceeding the predetermined resample threshold will comprise the touch value falling below (in magnitude) the predetermined resample threshold.

Said predetermined resample threshold may be at a level lower than of a touch threshold indicative of a touch event.

At each intersection point for which the scan operation is repeated, the results of the repeated scan operations may be averaged. Between 1 and 20 repeat scans may be performed for each of these intersection points.

BRIEF DESCRIPTION OF THE DRAWINGS

Embodiments of the invention will now be described, by way of example only, by reference to the accompanying drawings, in which:

FIG. 7 shows an example screen output, illustrating the performance gains of the method illustrated in FIG. 6;

FIGS. 9a and 9b are flowcharts illustrating an improved method for detecting a touch;

DETAILED DESCRIPTION OF THE EMBODIMENTS

Touch screens are well known in the art. They work by sensing the presence of a touching object on the screen surface. There are a number of different touch screen implementations, each having their own advantages and disadvantages. Some touch screens, known as multi-touch screens, are able to resolve the positions of two or more simultaneous touches on the screen.

Capacitive touch screens rely on a conductive object (such as a finger) affecting the capacitance locally at a screen surface. Different technologies may be used to determine the location of the touch. The location is then sent to a controller for processing. Mutual Capacitance Projected Capacitive Technology (PCT) is a variant of capacitive touch technology. Applying a voltage to a grid of electrodes creates an electrostatic field, which can be measured. When a conductive object comes into contact with a PCT panel, it distorts the local electrostatic field at that point, resulting in a measurable change in capacitance. The capacitance can be changed and measured at every individual point on the grid.

Figure 1:
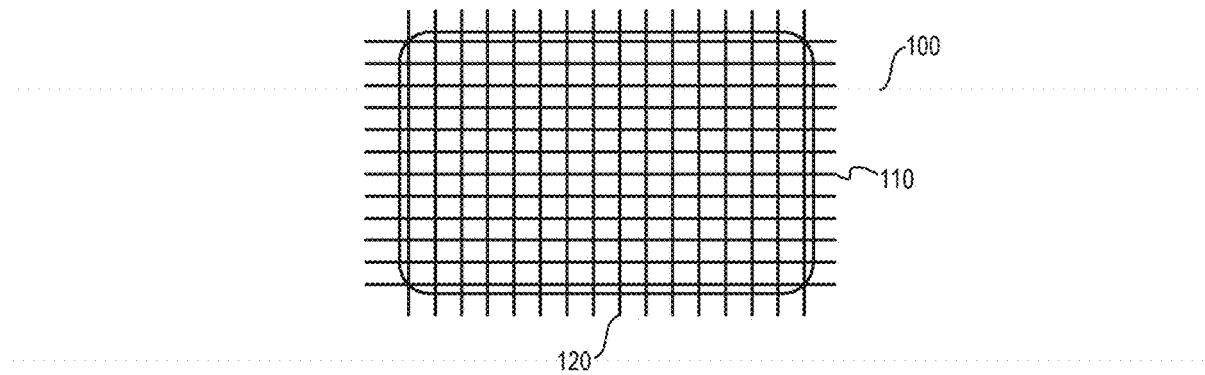
FIG. 1 shows schematically a touch screen sensor suitable for use in embodiments of the invention.

FIG. 1 shows a touch screen sensor 100 such as that used in embodiments of the invention. It comprises input electrodes (column or x-electrodes) 120 and output electrodes (row or y-electrodes) 110. At every row/column intersection or crossing point there is no direct electrical connection, as the input and output electrodes are electrically isolated. Instead a capacitor is formed at the intersection due to the proximity of the input and output electrodes at that point. The electrodes 110, 120 may be layered on a sheet of glass. This can be done, for example, by etching column and row electrodes separately on two perpendicular layers of conductive material, with parallel lines or tracks to form a grid. Such arrangements may use an Indium Tin Oxide (ITO) coating to create the electrodes, which are insulated from one another.

Figure 2:
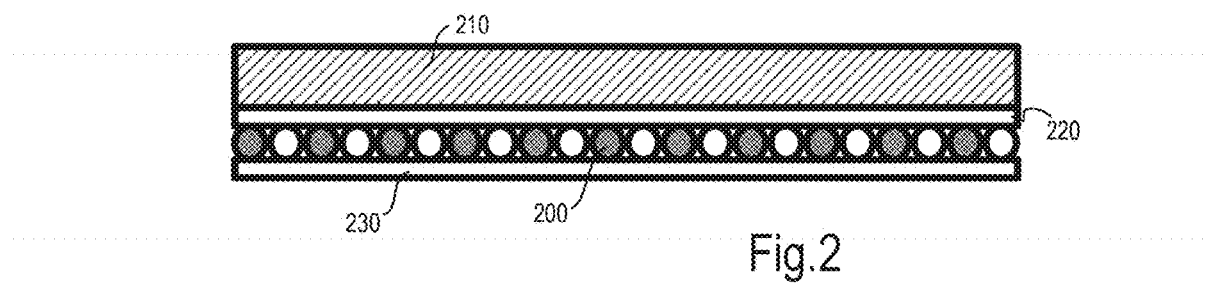
FIG. 2 shows a specific implementation of a touch screen sensor suitable for use in embodiments of the invention.

FIG. 2 illustrates a novel alternative to this arrangement, and is described in detail in a number of other patent applications being filed by the present applicant on the same day as this application. In this arrangement, the electrodes 200 comprise arrays of insulated conducting wires. The electrodes 200 are attached to a front glass substrate 210 by a layer of adhesive 220. The layer of electrodes 200 are protected on their other side by a protective layer 230 which may comprise PET film.

The electrodes 200 may comprise copper wire of, for example, 8 μm to 18 μm thickness. The insulation may comprise 1 μm to 2 μm thick polyurethane insulation. This allows the input and output electrodes 200 to be deposited over each other on the same layer without shorting with each other. Since the input and output electrodes 200 can be deposited on a single layer, a simplified multi touch sensor construction can be achieved over current traditional ITO sensor constructions.

Figure 3A:
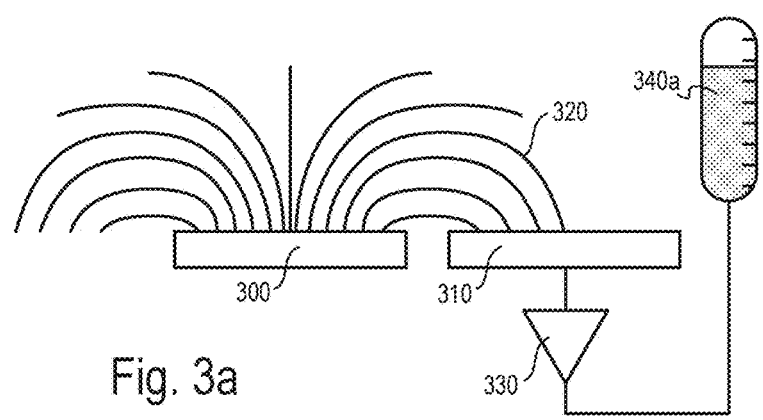
FIGS. 3a and 3b are schematic diagrams illustrating the basic operating principle of mutual capacitance PCT sensors.
Figure 3B:
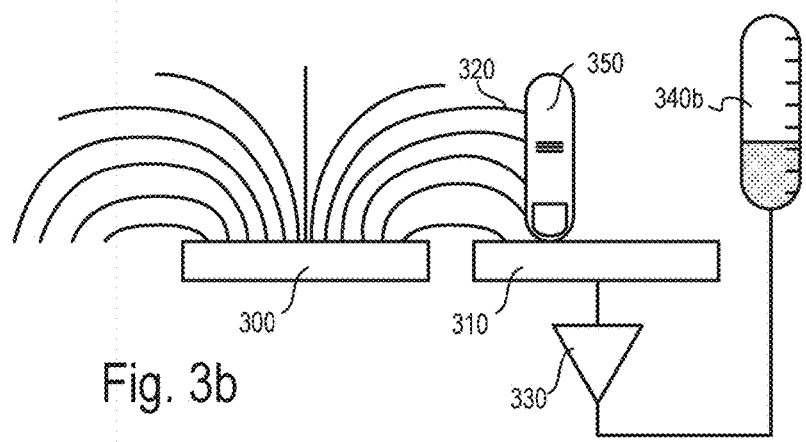

FIGS. 3a and 3b illustrate the basic principle of how mutual capacitance PCT sensors operate. It shows an input electrode 300 and output electrode 310 which form part of an input array (or x-array) and output array (or y-array) respectively. A pulse of energy is transmitted to the input electrode 300 and, at intersections of each input and output electrode, is received via capacitive coupling (represented by electric field lines 320) by the output electrode 310. Electronic circuitry (represented by amplifier 330) measures the energy received in the output array, symbolically represented here by meter 340a. FIG. 3b show what happens when a conductive object (here a finger 350) is applied to the sensor. The applied finger 350 capacitively couples some of the energy 320 away to ground, with any residual energy being received by the output array of electrodes. Consequently meter 340b is shown with a lower reading than meter 340a. This drop in energy is measurable, and its location can be determined for each touch, even where there are multiple simultaneous touches.

Figure 4:
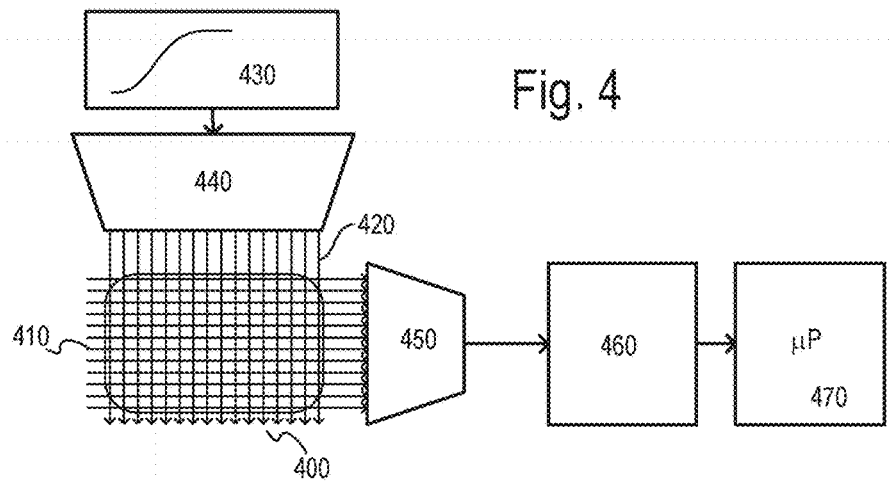
FIG. 4 shows schematically a touch sensitive device apparatus according to embodiments of the invention.

FIG. 4 shows schematically a touch sensitive apparatus comprising a sensor 400. The sensor, as before, comprises an input array of electrodes 420 and an output array of electrodes 410. Typically a sensor might have 80 input electrodes and 48 output electrodes. A level generation circuit 430 is used, via multiplexer 440, to rapidly increase the voltage on each of the input electrodes in turn. As a result, a small pulse appears on each of the output electrodes, the size of the pulse being dependent on the extent of the capacitive coupling. Typically for a +24V swing on one of the input electrodes, each output electrode receives a (order of) 50 mV pulse. This is reduced by about a third if a finger is in contact with the sensor glass near to the particular intersection point. Pulses on each output electrode are received in turn, via multiplexer 450, by a receive circuit 460 and then measured and processed by microprocessor 470. Microprocessor 470 may control some or all aspects of this touch sensitive apparatus, including the calculations required for touch detection.

Figure 5:
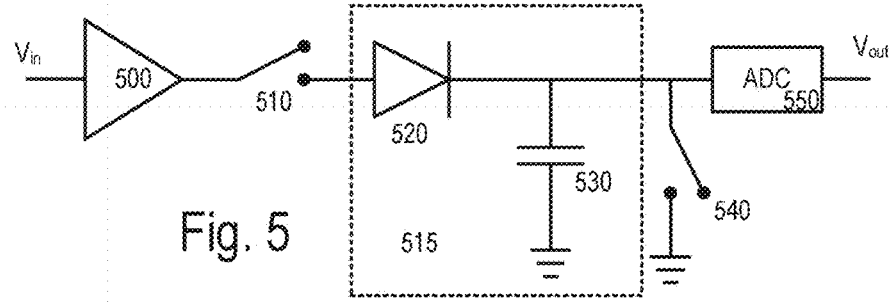
FIG. 5 shows schematically a detail of the receive circuit of FIG. 4.

FIG. 5 shows a possible implementation of the receive circuit 460 of FIG. 4. The circuit comprises amplifier 500, peak detector input switch 510, a peak detector 515 comprising diode 520 and capacitor 530, a reset switch 540 and an analogue to digital converter (ADC) 550, arranged as shown.

Multiplexer 450 sequentially connects receive circuit 460 to each output electrode of the output array 410. In this way, a pulse signal $V_{in}$, is received by the receive circuit 460. The operational amplifier 500 amplifies the signal $V_{in}$, to (for example) an approximately 1.5V pulse. Peak detector input switch 510 enables this signal to be presented to peak detector 515. The peak detector 515 identifies the maximum level of the signal. Peak detector input switch 510 then disconnects the incoming level so that the peak detector 515 maintains this peak value. An ADC 550 samples the level stored on the peak detector 515. Finally a reset switch 540 is operated to short the peak detector capacitor 530 and return the level on the peak detector to zero.

Use of a peak detector 515 is beneficial because the timing of the pulse is not critical. However, a simple "sample and hold" may be used instead (for example by removing the diode 520 from the circuit). The two mechanisms have different properties for noise rejection and EMC performance.

Resample on Touch

A complete sensor scan consists of a number of hardware scan operations, each evaluating the capacitive coupling between one input electrode and one output electrode. The number of hardware scan operations required to scan the whole sensor once is:

$$N_x * N_y$$

where $N_x$ is the number of input electrodes and $N_y$ is the number of output electrodes.

However the measurements comprise some level of noise. Minimising noise is important for various reasons, such as avoiding false touches and getting good touch location precision. As a consequence, multiple scan operations should be performed at each intersection, for each complete sensor scan operation, with the results combined (for example) by averaging them. A typical number of hardware scans performed and averaged in each complete sensor scan may be three. Consequently, the number of hardware scan operations required for a complete sensor scan may be:

$$N_x * N_y * 3$$

This takes much longer than a single scan, and results in a drop in the frame rate. This ultimately makes the user's experience of the touch operation to feel slower, or to perform less well. For example, there may be a reduced number of points when drawing a circle, making the circle appear rather staggered.

Figure 6:
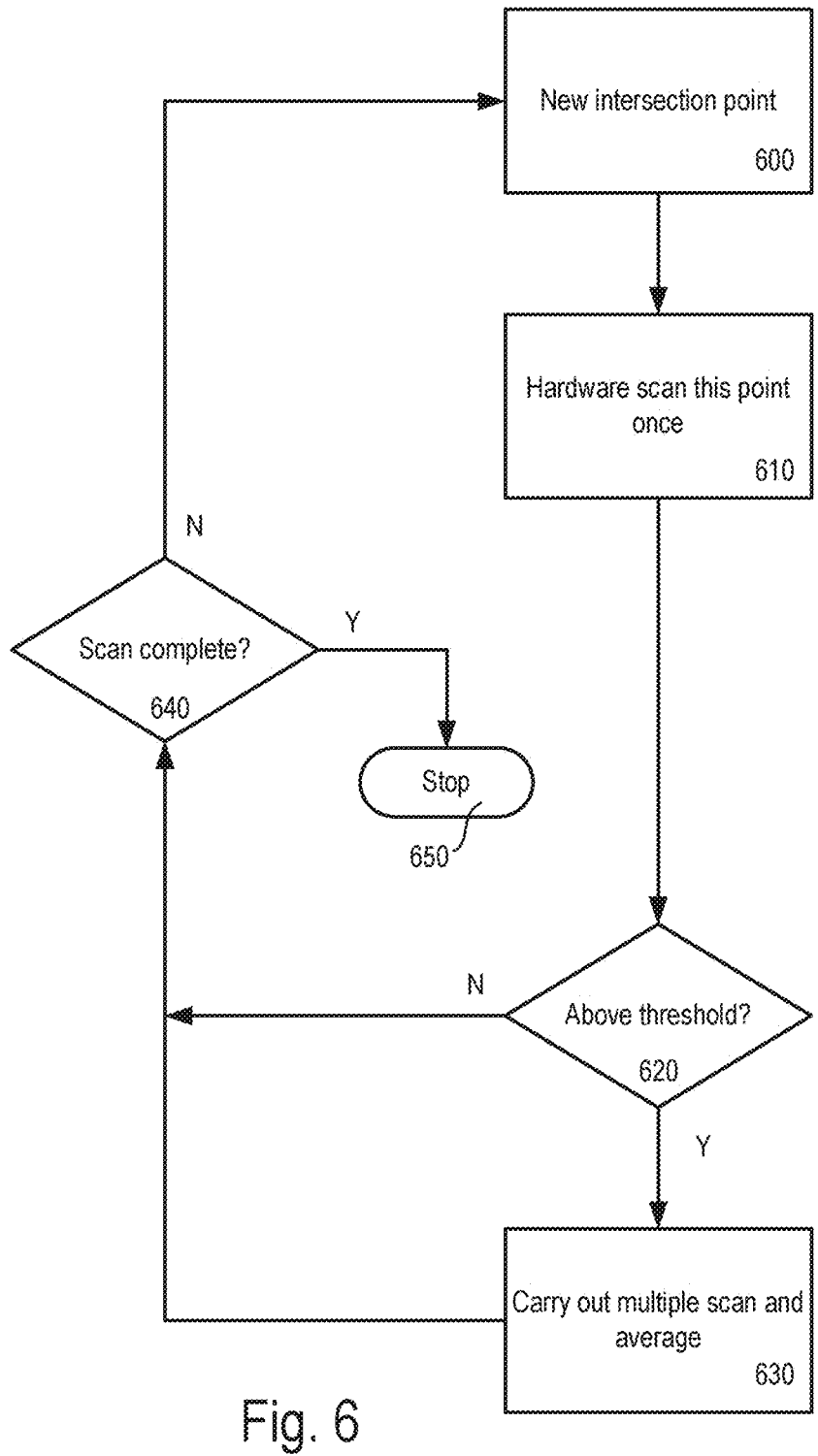
FIG. 6 is a flowchart illustrating an improved resampling method.

It is therefore proposed to perform multiple sampling only at the points at or near a potential touch. This "resample on touch" operation delivers the advantages of reduced noise whilst avoiding much of the additional time overhead. FIG. 6 is a flowchart describing this operation. At step 600, a new intersection is considered and, at step 610, scanned. The measurement from this scan is compared to a threshold at step 620. Only if the scan measurement is above the threshold is the point re-sampled and averaged (step 630). A further two scans may be performed during this step, for example. However, if the comparison at step 620 is below the threshold, the re-sample step 630 is omitted. At step 640 it is determined whether all intersections have been scanned: if yes, the scan stops 650; if no, the scan returns to step 600 and the routine repeated for the next intersection.

By using this method the total number of hardware scan operations becomes:

$$(N_x * N_y * 1) + (N_T * s)$$

where $N_T$ is the total number of points measured above the threshold and s is the number of additional scans performed at these points (which may be two, for example).

Figure 7:
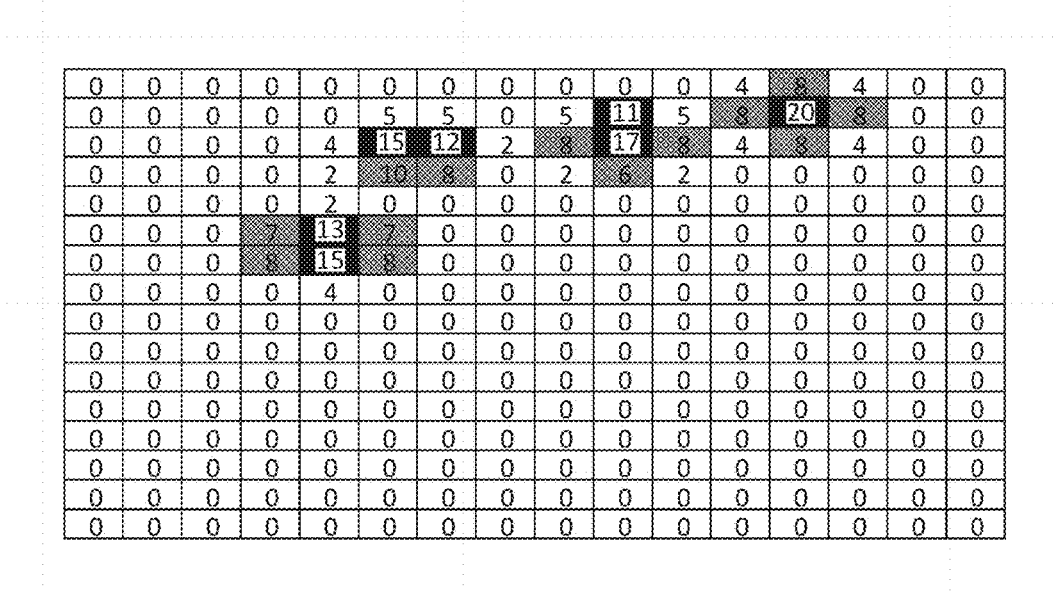

A typical reduction in processing effort can be seen from the following example shown in FIG. 7. Its shows a screen having 16×16 cells. The number shown for each cell is a relative scan measurement result (arbitrary units). In this example, the resample on touch threshold level has been set to be the same as the touch threshold level, although they can be different. Purely for illustration, the threshold level here is 10, such that a touch is detected and resampling performed for all cells measure over 10. A normal complete scan for this screen would take 16*16*3=768 operations.

The screen is shown with four points having been touched. The darkest cells are those measured above the touch/resample threshold level (one touch may result in more than one adjacent cell being measured above the touch threshold). Here there are seven such cells. Therefore, using the method of FIG. 6 to perform a complete scan, and taking three samples at each location measured above the threshold, results in a total number of hardware scan operations:

$$16*16*1+7*(3-1)=270$$

As mentioned previously, the resample threshold level may be set lower than the touch threshold level. Using the example of FIG. 7, with the resample level illustratively set to 5 (cells shown with lighter shading), it can be seen that only an additional 13 cells need resampling. This results in a total of 296 hardware operations for a complete scan.

Good quality information is still available at all touched locations, which can be used to make good location estimates. The increased speed comes as a result of not wasting effort in gathering reduced noise information at locations that are not touched. In the specific example shown, the number of hardware scan operations required has been reduced from 768 to 270, or 65%. This saving can be used to save energy or reduce hardware resources or processing effort, or to increase the frame scanning rate.

The above example is for four touches on a 16×16 grid. The ratio of speed up varies with number and size of touches, the sensor size, threshold limits and number of resamples. Larger screens, for example, will not only have a larger grid, but usually require more resampling to reduce noise sufficiently (say five times). Consequently, greater efficiency savings can be realised for these screens.

Row/Column Elimination

Figure 8:
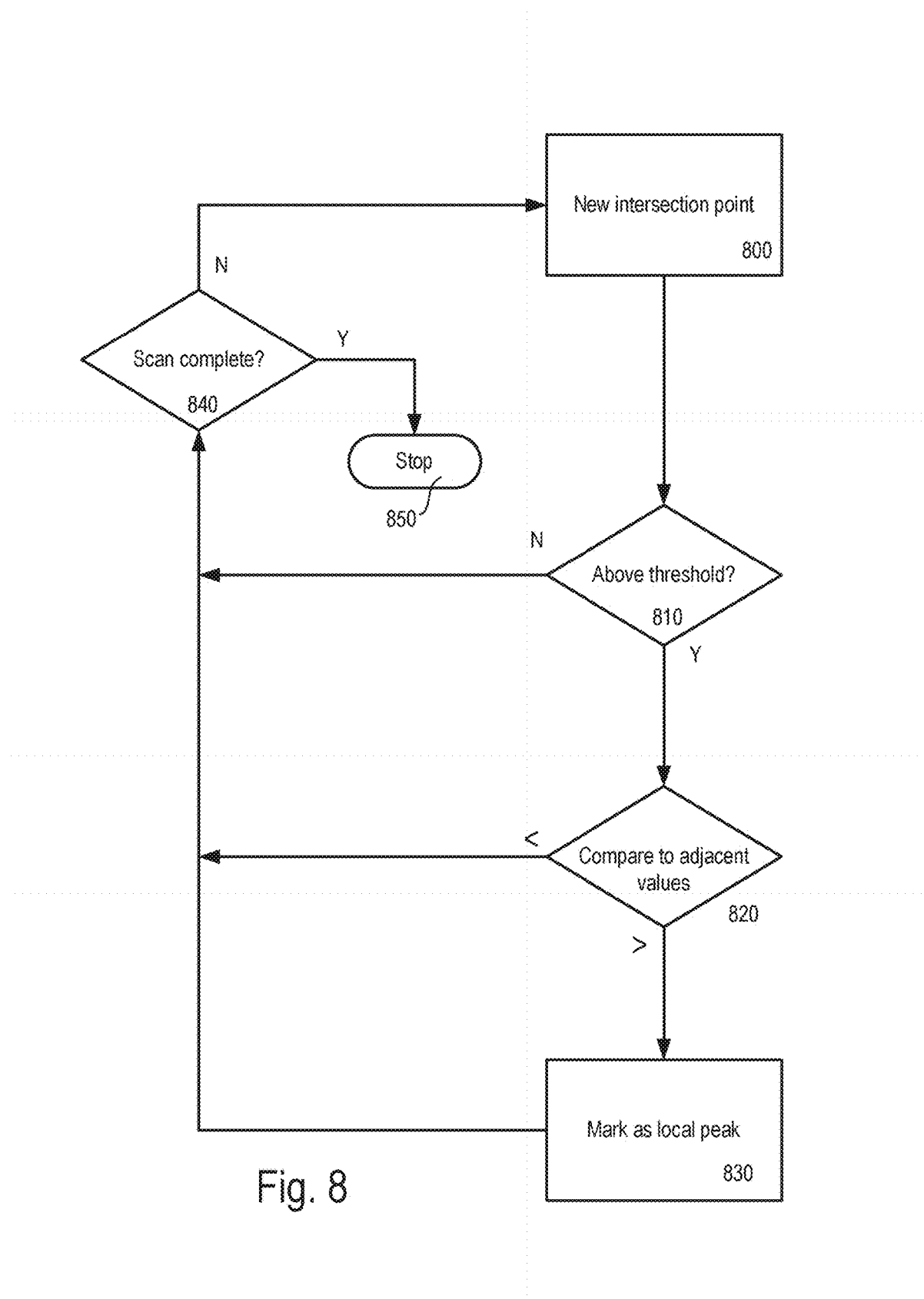
FIG. 8 is a flowchart illustrating a method for detecting a touch.

In order to detect touches, a region detector is provided which identifies individual contacts from an array of scan data. It does this by identifying local peaks in the scan data. FIG. 8 illustrates how this may be done. For each intersection (step 800), it is determined whether the measured value is above a threshold (step 810). If it is above a threshold then the measured value is compared to each surrounding value in turn (step 820). If the measured value is higher than that of the surrounding values it is flagged as a peak (830). This process is repeated for each intersection until complete (steps 840 and 850). This method is somewhat intensive and takes a large amount of processor time, even on a fast embedded processor.

Figure 9A:
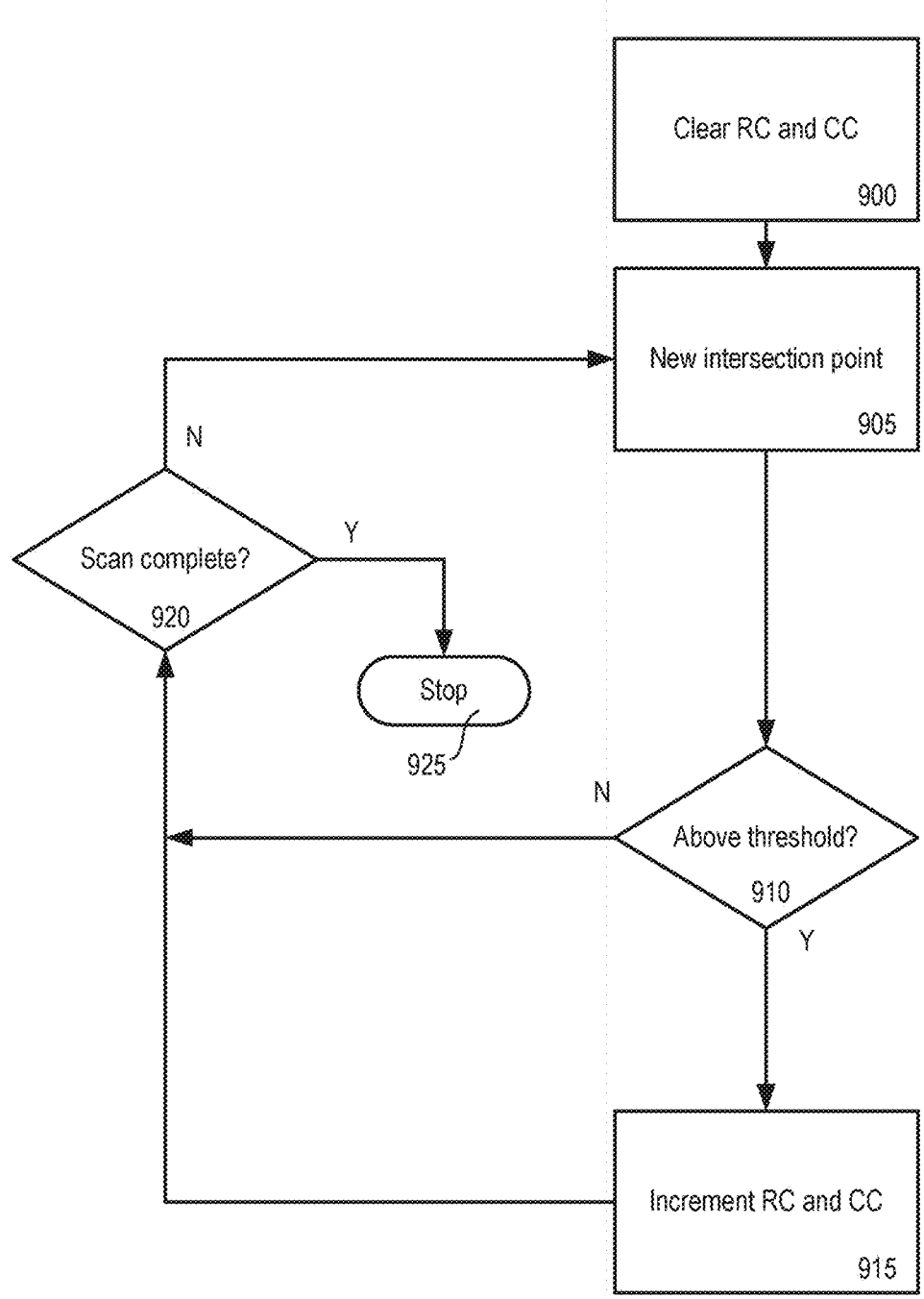

FIGS. 9a and 9b illustrate an improved process which reduces this processing time and effort. The process operates in two parts. FIG. 9a illustrates the first of these parts, which is performed in the scanner, that is the apparatus which actually performs the scanning of the output electrodes to detect touch. The process uses two counter value arrays, a Row Counter array RC, for counting the number of rows (each row may be defined by an output electrode) for which a touch is detected (or threshold exceeded), and a Column Counter array CC, for counting the number of columns (each column may be defined by an input electrode) for which a touch is detected (or threshold exceeded).

At step 900, arrays RC and CC are reset. At step 905, as each value is scanned and stored, it is compared to a threshold level 910. (This comparison may be the same as that performed for the previous "resample on touch" method, and therefore this step may be shared if both of these methods are being performed). If the value is above the threshold, a row count array RC counter, and a column count array CC counter are both incremented for the corresponding row and column (step 915). This process is repeated for each intersection until complete (steps 920 and 925).

FIG. 9b illustrates the second part of this process, performed in the region detector (that is the apparatus which processes the scanner output to calculate which region of the sensor that a touch was made). At step 930 the number of RC counter values above zero in the row count array RC are counted. This represents the number of rows in which a value above the threshold can be found. At step 935, the number of CC counter values above zero in the column count array CC are counted. This represents the number of columns in which a value above the threshold can be found. At step 940 it is determined which of these counter arrays have a greater number of values above zero. If it is the column count array CC that has the greater number of non-zero values then, at step 945 a first row is selected for which (at step 950) it is determined whether the row count array RC counter is above zero. If it is above zero, each value in the row is processed one by one (step 955), otherwise the row is skipped. This is repeated for each row. If the determination at step 940 goes the opposite way, then, at step 960 a first column is selected for which (at step 965) it is determined whether the column count array CC counter is above zero. If it is above zero, each value in the column is processed one by one (step 970), otherwise the column is skipped. This is repeated for each column.

Figures 10, 11:
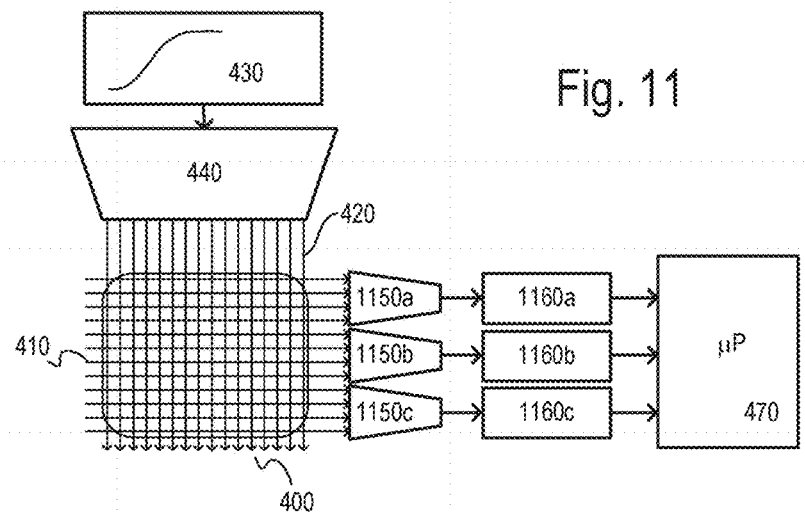
FIG. 10 shows an example screen output, illustrating the performance gains of the method illustrated in FIGS. 9a and 9b.
FIG. 11 shows schematically a touch sensitive device apparatus having parallel receive circuits.

A typical reduction in processing effort can be seen from the example of FIG. 10. Here four points on the screen have been touched. The darkest shaded cells are above the touch threshold level, which here is set to 10. The scanner also provides a row count array RC and column count array CC (bold digits). These contain the number of values above threshold in each row and column respectively. For example, the second value in the row count array RC is set to 2 because two values in that row (11 and 20) are above the threshold level. This is therefore a "non-zero" row. In contrast the first value in the row count array RC is set to zero as no values in that row are above the threshold level: it is a "zero-row". Note that the touch threshold and threshold for incrementing the row or column counter is the same in this example, although this does not have to be the case.

Some inputs (e.g.: four fingers along the same row) favour "zero row" elimination, whilst others (e.g.: four fingers along the same column) favour "zero column" elimination, and the algorithm attempts to select the optimal basis for elimination based on the data in the present frame. In the specific example shown here, the region detector counts the number of non-zero rows: here there are 4. It then counts the number of non-zero columns: here there are 5. As there are fewer non-zero rows than non-zero columns, the region detector decides to go through the data row by row. Of course, for non-square sensors (that is sensors for which the number of columns and number of rows are not equal), deciding whether "zero row" elimination or "zero column" elimination is preferred is not as straightforward as shown here. A different criteria should be selected which takes into account the relative difference in the row and column sizes when determining the most efficient method. Formulating such criteria, and therefore adapting the method of FIG. 9b accordingly, is well within the capabilities of the skilled person.

By examining the row count array RC in this specific example, it can be seen that the first row can be skipped with no further effort. The next two rows are processed, the next two skipped, the next two processed, and then the entire lower half of the sensor is skipped. This results in very significant processing effort reduction.

In the example shown in FIG. 10, the number of items the region detector has to process using the method of FIG. 8 is:

$$16*16=256$$

Using the method of FIGS. 9a and 9b, the number of items the region detector has to process (in this specific example) is:

$$16*4=64$$

which is a processing reduction of 75%. The improvement varies for different sensor sizes, number of touches, threshold limits and touch patterns, for example, with just a single touch even better performance gains will be observed. In most cases a substantial processing time improvement will be achieved, which can be used to improve frame rates or reduce the cost of processing hardware.

It should be noted that a special case exists where there are no touches, as the region detector avoids examining any data values at all.

Other mechanisms can also see efficiency improvements from row/column elimination in a similar manner. For example blur and despeckle filters, and other parts of the region detector, may benefit from these methods.

The specific row/column elimination method illustrated here may be varied. For example, an alternative to having integer row count and column count arrays, it would be possible to have binary flags (indicating either "zero-row/column" or non-zero row/column) and simply set these when a value in its corresponding row/column is above the threshold. Also, the threshold for incrementing the array counter or setting the binary flag may be different to the touch threshold. Using the FIG. 10 example, with this threshold set at 5, only an additional two rows (the first and fourth row) need to be processed.

Note that row and column elimination can be used together as in this example, or only one of row elimination or column elimination could be used on its own. Using them together should be expected to give advantages in a greater number of situations, at the expense of slightly more code in order to handle both.

Parallel Receive and Convert

As explained in relation to FIGS. 4 and 5, a full sensor scan is completed by repeatedly applying changes to the voltage on input electrodes on one axis (x) whilst monitoring the size of the voltage spike induced on electrodes on the output electrodes of the other axis (y). The voltage on the output electrode is amplified and peak detected, and this level is measured with an ADC (analogue to digital convertor).

When using a single pulsing circuit, a single receive circuit and a single ADC, a simple estimate of the time taken to do a full sensor scan can be calculated as:

$$\text{Scan time} = ECX*ECY*(t_p+t_{ADC})$$

where ECX is the number of input sensor electrodes, ECY is the number of output sensor electrodes, $t_p$ is the pulse time+$t_{ADC}$ is the time for ADC reading.

Using the following example parameters in the above scan time equation: ECX 32 80, ECY=48, Pulse time=1.0 μs (estimated, depends on settling time desired for the previous signal to decay between pulses) and time for ADC reading=1.0 μs (estimated, depends on ADC speed and accuracy settings used); the scan time will be 80*48*(1.0 μs+1.0 μs)=7.68 ms. Therefore the scan rate, which is the reciprocal of the scan time, is 130 Hz.

The scan rate is very important in practice, as high scan rates mean good touch response for the user. Also under noisy conditions it is possible to reduce the effect of noise by repeating scans, which is clearly more feasible when the scan can be performed quickly.

A possible way of improving the scan time may be to provide multiple receive circuits (one for each output electrode), multiplexed into a single ADC. This would only require a single pulse to capture response values at each point down an input electrode column. The ADC is then used to measure these captured values one at a time. This is repeated for each column. The total sampling time for this configuration can be estimated as follows:

$$\text{Scan time} = ECX*(1*(t_p) + ECY*(t_{ADC})).$$

Using the values above the scan time may be 80*(1*1.0 us+48*1.0 us)=3.92 ms, in which case the scan rate would be 255 Hz. This is a substantial speed up over a system with only a single receive circuit.

FIG. 11 shows an arrangement which can further improve on this scan rate, while reducing the hardware overhead. The arrangement is similar to that of FIG. 4, but instead of receive circuit 460, there are three receive circuits 1160a, 1160b, 1160c. Each of the receive circuits 1160a, 1160b, 1160c may be the same as that shown in FIG. 5. Of particular importance is that each receive circuit has its own ADC. Each receive circuit 1160a, 1160b, 1160c is connected to the output array via a dedicated multiplexer 1150a, 1150b, 1150c, with the electrodes of the output array being shared between the multiplexers 1150a, 1150b, 1150c.

By using three receive circuits, rather than 48 as in the previous example, much less hardware is required (reducing cost and board space), but by using 3 ADCs it is still possible to complete scans very quickly. For each transmitted pulse the receive pulse is measured on three output electrodes at once.

The total sampling time for this configuration is as follows:

$$\text{Scan time} = ECX*(ECY/3)*(t_p+t_{ADC})$$

Using the example values above the scan time can be estimated to be 80*(48/3)*(1.0 us+1.0 us)=2.56 ms, providing for a scan rate of 391 Hz. This is a substantial speed up over previously known configurations, despite having reduced hardware costs.

As mentioned in relation to FIG. 5, while peak detect operation is used here, a timing based mechanism without a peak detector could be made to work as well. Also, in practice a further improvement in scan rate can be achieved by arranging for the pulse dying away time to occur whilst the ADCs are measuring the peak voltage.

It should be noted that, while three receive circuits have been determined to provide a particularly beneficial compromise between scan time and hardware overheads, the arrangement of FIG. 11 may be amended to comprise a different number of receive circuits, for example 2, 4 or 5.

Receive Circuit Interleaving

It is proposed above to provide for parallel receive circuits to enable parallel reading of a number of the receive electrodes. In one example, three such receive circuits are provided, allowing three receive electrodes to be simultaneously read. The examples below show how interleaving the multiplexor receive circuit can reduce scan time on smaller sensor sizes with a reduced number of receive electrodes without modifying the hardware structure.

In a normal sized array there may be 48 (or another multiple of three) receive electrodes. In such a case there will be 16 scan periods, with three electrodes simultaneously scanned in each scan period. The receive circuits are usually arranged such that one receive circuit is connected to a first group comprising the first (e.g. top) 16 receive electrodes in the array, another receive circuit is connected to a second group comprising the next (e.g. middle) 16 electrodes in the array and the other receive circuit is connected to a third group comprising the last (e.g. bottom 16 electrodes in the array. In each scan period, one electrode from each group is scanned, such that the first electrodes in each of the first, second and third groups are scanned in the first scan period, the second electrodes in each of the first, second and third groups are scanned in the second scan period, and so forth.

Figure 12:
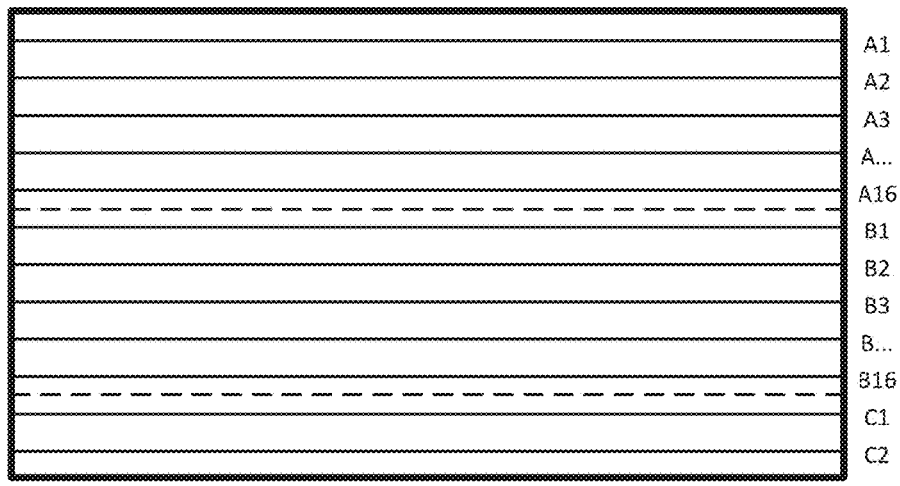
FIG. 12 illustrates an output electrode arrangement.

FIG. 12 illustrates the drawback with such a receive arrangement when a smaller sensor (that is a sensor with fewer receive electrodes) is connected to it. Shown here is an example of a sensor with 34 receive electrodes. As before they are arranged in groups, so that the first group comprising the top 16 electrodes (A1-A16) are connected to one receive circuit, and the second group comprising the middle 16 electrodes (B1-B16) are connected to another receive circuit. This means that one receive circuit is connected to only two electrodes (C1-C2) which make up the third group. This is inefficient and results in the same number of scan periods being needed to scan this smaller 34 electrode array as was needed to scan the 48 electrode array. In only the first and second scan periods are three electrodes scanned simultaneously: A1, B1 and C1 in the first scan period and A2, B2 and C2 in the second scan period. In each of the following scan periods only electrodes from the first and second groups are scanned.

Figure 13:
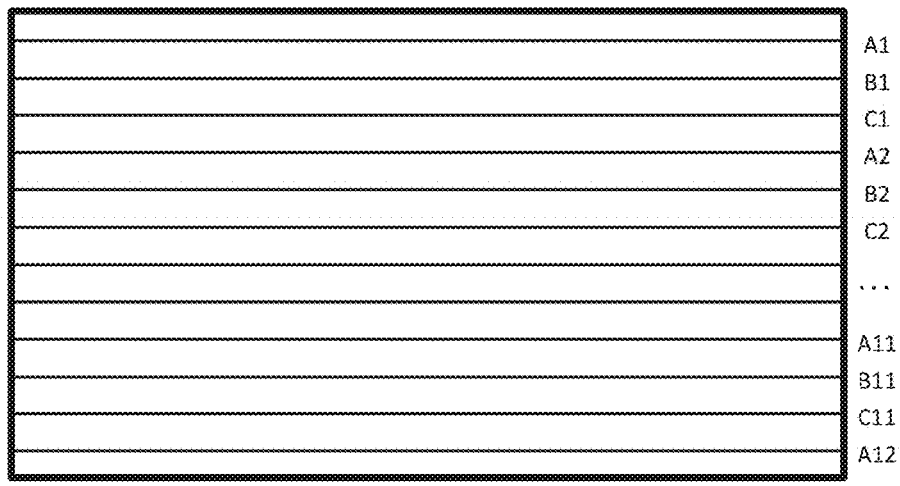
FIG. 13 illustrates an improved interleaved output electrode arrangement.

FIG. 13 shows how the electrodes may be interleaved between the receive circuits, such that each successive electrode is connected to a different one of the receive circuits in turn. Consequently the first group of electrodes (A1, A2, A3 etc.) comprise every third electrode, starting from the first, the second group of electrodes (B1, B2, B3 etc.) comprises every third electrode starting from the second electrode and the third group of electrodes (C1, C2, C3 etc.) comprises every third electrode starting from the third electrode. In this way, when a sensor comprising 48 receive electrodes is being read, 16 scan periods are still required, but when a sensor of (say) 34 electrodes is connected, only 12 scan periods will be needed and efficiency savings can be achieved.

Percentage Scanner

As previously mentioned, when a large (e.g. 24V) step is applied to one of the input electrodes, a small pulse is induced on each of the output electrodes. Typically, with the sensor untouched, this is about 50 mV. This pulse is processed by the receive circuit, during which the small pulse is amplified by the receive circuit's amplifier. If, for example, the amplifier has an effective gain of 50, and the peak detector diode drops a fixed 0.5V, the resulting peak level detected and converted by the ADC may be 2.0V.

The actual magnitude of the induced pulse depends on whether or not there is an object touching the point where the pulsed input electrode crosses the output electrode being measured. Typically this reduces the height of the pulse seen on the output electrode by up to about 40%. Therefore, using the same example values, when touched, an output electrode might typically see a pulse of about 30 mV. This is amplified to about 50*30 mV=1.5V. The peak detector diode drops 0.5V resulting in typically 1V measured at the ADC.

In order to detect a touch, a threshold level of 1.5 volts may be set. The level of the threshold is important for distinguishing real touches from noise. The voltage reading is also important for estimating the exact location of a touch when it is somewhere between two electrodes. The interpolator looks not just at the electrode for which the signal is most affected by the touch, but also at the levels of the electrodes around it. From this it is able to estimate the exact x, y position of a touch to much greater precision than "nearest electrode". In theory, where a sensor has only 80×48 electrodes, the co-ordinate position of the touch can be resolved to a point on a (for example) 4096×4096 grid (although due to signal noise the result will never be exact). Measuring very precisely the amount that a signal is reduced by is important for getting interpolator operation to work well.

Unfortunately, electrode voltage levels do not all start the same. With an untouched sensor it can be observed that the voltage peaks vary somewhat depending on which input and output electrodes are respectively pulsed and measured. This can be for many reasons, such as proximity to a metal frame, or track conductivity under certain circumstances. Often the most severe difference is seen at the extreme edge electrodes, which can see a pulse on the output electrode that is significantly reduced, perhaps (for example) to about a half of the level seen on other electrodes. If this were the case, after processing by the receive circuit, the peak level detected may be 0.75V. With a threshold level set at 1.5 volts, this edge electrode reading would always be detected as a touch, even when untouched.

A possible method to address this issue is to make a scan of voltage levels when the sensor is untouched. This could be recorded as a full x, y grid of offset values, one for each intersection point on the sensor. In practice, readings may be repeated several times and averaged to reduce the effect of noise. The resultant values can be subtracted, in operation, from the offset values. A difference value of 0 indicates no touch. A large difference value indicates a touch.

For example, in the middle of the sensor the following values may be seen:
Untouched "offset" value=2.0V
Touched value=1.0V
Difference=1.0V Consequently a difference threshold of 0.5V may be chosen, such that anything with a difference of 0.5V or greater from its offset value is declared to be a touch.

At the edges, typical offset values may be:
Untouched "offset" value=0.75V
Touched value=25 mV(example pulse level at sensor edge without touch)*40%(fall in level due to touch)*50 (amplifier gain)−0.5V(diode drop)
=0.25V
Difference=0.5V With a difference threshold of 0.5V it would be very marginal whether this would be detected as a touch or not.

Therefore a "percentage scanner" is proposed. This adds an additional processing stage, in which the voltage drop is calculated as a percentage of the untouched voltage level. This percentage value can then be compared against a threshold percentage drop, and for use in the interpolator.

Therefore, for a typical point in the middle of the sensor:
Untouched value=2.0V corresponding to a 50 mV pulse
Touched value=1.0V corresponding to a 30 mV pulse
Difference=1V corresponding to a 20 mV difference
Percentage change=20 mV/50 mV=40% drop.

And for a point at the edge of the same sensor:
Untouched value=0.75V corresponding to a 25 mV pulse
Touched value=0.25V corresponding to a 15 mV pulse
Difference=0.5V corresponding to a 10 mV difference
Percentage change=10 mV/25 mV=40% drop.

So if the threshold is set at, for example, a 20% drop, a touch can be detected equally reliably in both the middle and edge of the sensor. Also the values provided to the interpolator are better than they would be using the described alternatives, resulting in more accurate touch location estimates.

This method addresses the problem of non-uniform coupling across a sensor, allowing consistent touch detection and accurate touch location estimation with real sensors.

It will be understood that the particular component parts of which the various arrangements described above are comprised are in some examples logical designations. Accordingly, the functionality that these component parts provide may be manifested in ways that do not conform precisely to the forms described above and shown in the diagrams. For example some aspects, particularly many aspects of the touch detection methods disclosed herein, may be implemented in the form of a computer program product comprising instructions (i.e. a computer program) that may be implemented on a processor, stored on a data sub-carrier such as a floppy disk, optical disk, hard disk, EPROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

It should be appreciated that the methods and apparatuses disclosed herein are complementary and some or all may be combined within a single method or apparatus.

The invention claimed is:

1. A touch sensitive display comprising:
a sensor having an input array of electrodes and an output array of electrodes, wherein the output array of electrodes is capacitively coupled to the input array of electrodes at a plurality of intersection points;
a controller operable to perform a scan operation at the plurality of intersection points of said input array using a plurality of base touch values and a predetermined proportional touch threshold, the plurality of base touch values reflecting touch-value variation at the plurality of intersection points when there is no touch event on the sensor;
wherein, for each intersection point of the plurality of intersection points, the scan operation comprises:
measuring a touch value for said intersection point;
determining a proportional difference between said touch value and a base touch value of the plurality of base touch values, wherein said proportional difference is determined based on the difference between said touch value and said base touch value as a proportion of said base touch value, wherein said base touch value is indicative of a touch-value measurement at said intersection point when there is no touch event on the sensor; and
comparing said proportional difference to said predetermined proportional touch threshold so as to determine whether there is a touch event at that point, wherein said predetermined proportional touch threshold is defined as the difference between a given touch value and a given base touch value, as a proportion of said given base touch value, indicative of there being a touch event.

2. The touch sensitive display as claimed in claim 1, wherein said controller is further operable to measure said base touch value for each intersection point.

3. The touch sensitive display as claimed in claim 1, wherein said predetermined proportional touch threshold is between 10% and 30%.

4. The touch sensitive display as claimed in claim 1, wherein said sensor is operable such that a change in voltage applied to one of the electrodes of said input array results in a voltage pulse on the output array electrodes, the magnitude of which is indicative of a touch event.

5. The touch sensitive display as claimed in claim 1, wherein each of the electrodes of said input array of electrodes and of said output array of electrodes comprises a conducting wire individually insulated with an insulating coating.

6. The touch sensitive display as claimed in claim 5, wherein the conducting wire is of diameter 8 μm to 18 μm.

7. The touch sensitive display as claimed in claim 5, wherein the insulating coating comprises a polyurethane coating having a thickness of 1 μm to 2 μm.

8. The touch sensitive display as claimed in claim 1, wherein the electrodes of said input array of electrodes are arranged substantially orthogonal to the electrodes of said output array of electrodes, each intersection point being where an input electrode crosses an output electrode.

9. The touch sensitive display as claimed in claim 1, wherein said input array of electrodes and said output array of electrodes are laid over each other so as to form a single electrode array layer in the sensor.

10. The touch sensitive display as claimed in claim 1, wherein said controller is further operable to detect a touch at an intersection point by transmitting a pulse on an input electrode and monitoring a corresponding pulse energy on one or more output electrodes, said corresponding pulse energy arising due to capacitive coupling between the input electrode and the one or more output electrodes.

11. A method of operating a touch sensitive display, said touch sensitive display comprising a sensor having an input array of electrodes and an output array of electrodes, wherein the output array of electrodes is capacitively coupled to the input array of electrodes at a plurality of intersection points, said method comprising:
 performing a scan operation at the plurality of intersection points of said input array using a plurality of base touch values and a predetermined proportional touch threshold, the plurality of base touch values reflecting touch-value variation at the plurality of intersection points when there is no touch event on the sensor;
 wherein, for each intersection point of the plurality of intersection points, the scan operation comprises:
  measuring a touch value for said intersection point;
  determining a proportional difference between said touch value and a base touch value of the plurality of base touch values, wherein said proportional difference is determined based on the difference between said touch value and said base touch value as a proportion of said base touch value, wherein said base touch value is indicative of there being no touch event on the sensor; and
  comparing said proportional difference to said predetermined proportional touch threshold so as to determine whether there is a touch event at that point, wherein said predetermined proportional touch threshold is defined as the difference between a given touch value and a given base touch value, as a proportion of said given base touch value, indicative of there being a touch event.

12. The method as claimed in claim 11 further comprising the step of measuring said base touch value for each intersection point.

13. The method as claimed in claim 11, wherein said predetermined proportional touch threshold is between 10% and 30%.

14. The method as claimed in claim 11, wherein a change in voltage applied to one of the electrodes of said input array results in a voltage pulse on the output array electrodes, the magnitude of which is indicative of a touch event.

15. The method as claimed in claim 11, wherein the electrodes of said input array of electrodes are arranged substantially orthogonal to the electrodes of said output array of electrodes, each intersection point being where an input electrode crosses an output electrode.

16. The method as claimed in claim 11, wherein said input array of electrodes and said output array of electrodes are laid over each other so as to form a single electrode array layer in the sensor.

17. The method as claimed in claim 11, wherein said method further comprises detecting a touch at an intersection point by transmitting a pulse on an input electrode and monitoring a corresponding pulse energy on one or more output electrodes, said corresponding pulse energy arising due to capacitive coupling between the input electrode and the one or more output electrodes.

18. A non-transitory program carrier comprising computer readable instructions which, when run on a suitable apparatus, cause the apparatus to perform the method of claim 11.

19. The method as claimed in claim 11, wherein said predetermined proportional touch threshold is defined as the difference between a touch value and a base touch value, as a proportion of said base touch value, indicative of there being a touch event.

* * * * *